(12) United States Patent
Jeannot (10) Patent No.: US 8,984,611 B2
(45) Date of Patent: Mar. 17, 2015

(54) SYSTEM, APPARATUS AND METHOD FOR SECURING ELECTRONIC DATA INDEPENDENT OF THEIR LOCATION

(75) Inventor: Cedric Jeannot, Waterloo (CA)

(73) Assignee: I Think Security Ltd., Kitchener (CA)

( * ) Notice: Subject to any disclaimer, the term of this patent is extended or adjusted under 35 U.S.C. 154(b) by 0 days.

(21) Appl. No.: 13/813,196

(22) PCT Filed: May 9, 2012

(86) PCT No.: PCT/CA2012/000440
§ 371 (c)(1),
(2), (4) Date: Jan. 21, 2014

(87) PCT Pub. No.: WO2012/151675
PCT Pub. Date: Nov. 15, 2012

(65) Prior Publication Data
US 2014/0130117 A1   May 8, 2014

Related U.S. Application Data (60) Provisional application No. 61/484,067, filed on May 9, 2011.

(51) Int. Cl.
*H04L 29/06* (2006.01)
*G06F 21/34* (2013.01)
*G06F 21/62* (2013.01)

(52) U.S. Cl.
CPC ............. *H04L 63/08* (2013.01); *H04L 63/0435* (2013.01); *G06F 21/34* (2013.01); *G06F 21/6218* (2013.01); *H04L 63/0428* (2013.01); *H04L 63/083* (2013.01); *H04L 63/10* (2013.01); *H04L 63/20* (2013.01)
USPC ............................................................ 726/9

(58) Field of Classification Search
None
See application file for complete search history.

(56) References Cited

U.S. PATENT DOCUMENTS

| | | | | |
|---|---|---|---|---|
| 2008/0056496 | A1* | 3/2008 | Parkinson et al. | 380/277 |
| 2008/0240447 | A1* | 10/2008 | Zhu et al. | 380/279 |
| 2010/0180120 | A1* | 7/2010 | Frenkel et al. | 713/173 |
| 2011/0040964 | A1* | 2/2011 | Nussbaum et al. | 713/155 |
| 2011/0246766 | A1* | 10/2011 | Orsini et al. | 713/160 |

* cited by examiner

*Primary Examiner* — David Pearson
(74) *Attorney, Agent, or Firm* — Nexus Law Group LLP; Nicholas Toth (57) ABSTRACT

The present disclosure relates to a system, apparatus and method for securing electronic files and folders independent of their location. A computer network implemented system for securing data is provided. The system includes a central server (400) that manages access to a secure data architecture that enables one or more data security operations including data encryption, data decryption and secure data sharing. A security appliance (200) is also provided that is interoperable with each of one or more computer devices (100) to integrate each computer device (100) into the secure architecture so as to enable data security operations at each computer device, by authenticating a user of each computer device (100) to the security appliance (200) and to the central server (400).

16 Claims, 6 Drawing Sheets

SYSTEM, APPARATUS AND METHOD FOR SECURING ELECTRONIC DATA INDEPENDENT OF THEIR LOCATION

PRIORITY

This application claims priority to U.S. provisional patent application No. 61/484,067, filed on May 9, 2011.

FIELD OF THE INVENTION

The present disclosure relates to systems, devices and computer implemented methods for securing data. The present disclosure further relates to systems, devices and computer implemented methods for enabling exchanging data securely.

BACKGROUND

Network connected computer devices are everywhere, especially with the explosion in use of wireless devices. They generate, communicate, monitor, and analyze vast amounts of data. Data is arguably the most important asset of businesses and is also value by individuals.

The number and level of sophistication of security attacks is growing. Cyber attacks, corporate espionage and insider threats occur are common ways in which data leaves a business's data infrastructure. Data is especially vulnerable to attack when files are either stored or transferred. Furthermore, human error has been shown to be a leading cause of data leakage.

It is estimated that the global cost of cyber attacks in 2010 alone was 1 trillion USD. The cost of cyber crime to Canadians alone in 2010 is estimated to have been 5.5 billion CAD. Furthermore some studies have estimated that in 2010 twenty percent (20%) of Canadian internet users suffered a cyber attack of some type.

In addition cyber attacks can cause substantial harm to the reputation of organizations.

Furthermore, it is well known that adoption of cloud services for accessing information and accessing applications can provide important improvements in functionality, accessibility and can reduce costs to business. However, security is a key reason why businesses are relatively slow to adopt cloud services.

A skilled reader will understand that presently, various security solutions exist for securing data in storage or during transmission. However, current security solutions tend to be either robust and expensive requiring a significant degree of technical expertise, or light and superficial providing only a minimum level of data security. Also, many data security solutions require skilled personnel, or training of staff, which can be expensive.

For example, some prior art data security solutions include whole disk encryption of all data on a computing device 100 (e.g. a computer's hard drive) is secured. While there is no risk to forgetting to encrypt a file with whole disk encryption, the question raised is whether it really is necessary to encrypt all files on a hard drive, including files related to the operating system, for example. Furthermore, files leaving the computer via a USB storage drive, e-mail or other network connection are not secured, and it is not possible to share files securely with other users. Using a secure USB drive provides similar limitations, as files may need to be stored on a hardware specific USB drive. As a significant limitation, only files on the drive are secured, and individual files cannot be shared securely without sharing both the device and the password. If the device is lost, both the files and security investment are lost.

Another example of a prior art data security solution includes the use of software encryption for securing data, which can be of high quality. But software encryption often requires the user to be familiar with security algorithms and processes, etc. In addition, if a password is lost, the files normally cannot be recovered. As another significant limitation, a password may need to be shared to share encrypted files with another user. The password is then the weak link of the security system.

Yet other data security solutions incorporate a Public Key Infrastructure (PKI) secure connection. Such prior art solutions may include hardware, software, people, policies, and procedures needed to create, manage, distribute, use, store, and revoke digital certificates. While potentially very effective, this approach may not be practical for companies that do not have the technical staff and resources to deploy the infrastructure. As well, even if the communication line is secured, the end points may not be secure.

Given all of the above limitations and vulnerabilities of prior art solutions, the present inventor has developed what is believed to be a novel, innovative technology to overcome at least some of these limitations and vulnerabilities.

What is needed is an improved system, apparatus and/or method that addresses some of the limitations of the prior art. In particular there is a need for a

SUMMARY

In one aspect of the invention, a computer network implemented system for securing data is provided, comprising: (a) a central server that manages access to a secure data architecture that enables one or more data security operations including data encryption, data decryption and secure data sharing; (b) at least one computer device; and (c) a security appliance that is interoperable with each computer device to integrate each computer device into the secure architecture so as to enable data security operations at each computer device, by authenticating a user of each computer device to the security appliance and to the central server, based on (i) login information provided by the user and (ii) authentication information associated with the security appliance.

In another aspect, in the computer network implemented system: (a) the user provides the login information to the security appliance; (b) in response to (a) the security appliance authenticates to the central server; and (c) upon authentication of the security appliance to the central server, the central server sends a message to the security appliance authorizing the security appliance to enable the user to initiate a data security operation using the security appliance.

In another aspect, each data security operation is enabled by the system based on interoperation of the security appliance and the central server.

In a still other aspect of the computer network implemented system, in order to initiate a encrypt/decrypt/share a file or document a user requires: their security appliance, their login information, and a file or document for the data security operation.

In yet another aspect of the computer network implemented system the security appliance is a portable secure key device. The portable secure key device may be configured to operate as a plug and play device and to interoperate with computer devices having different operating systems.

In another aspect, the portable secure key device includes a computer program component implemented as a bounded computer program configured to make an untrusted computer device part of a trusted security architecture enabled by the secure data architecture.

In this respect, before explaining at least one aspect of the system and method of the present disclosure in detail, it is to be understood that the present system and method is not limited in its application to the details of construction and to the arrangements of the components set forth in the following description or illustrated in the drawings. The present system and method is capable of other aspects and of being practiced and carried out in various ways. Also, it is to be understood that the phraseology and terminology employed herein are for the purpose of description and should not be regarded as limiting.

DETAILED DESCRIPTION

Definitions

The following words, when used in the present specification, have the following meanings:

"data" is any file or folder, or information within a file or folder, independently of its location. Illustrative examples of data may include client, customer or consumer information; confidential business information; intellectual property (i.e. software code); employee information; supplier or vendor information; finance or accounting information; pictures or drawings; and music or movies.

"data loss" is any data which is either lost, stolen or corrupted. The owner may or may not have a copy of the data, and the data content may be in plaintext or may be encrypted.

"data protection" is technology and/or operating procedures used to prevent data loss and restrict access to authorized users.

DESCRIPTION

As noted above, the present disclosure relates to a system, apparatus and method for securing electronic files (and folders), and enabling secure file sharing, independent of where the files are located.

Figure 1:
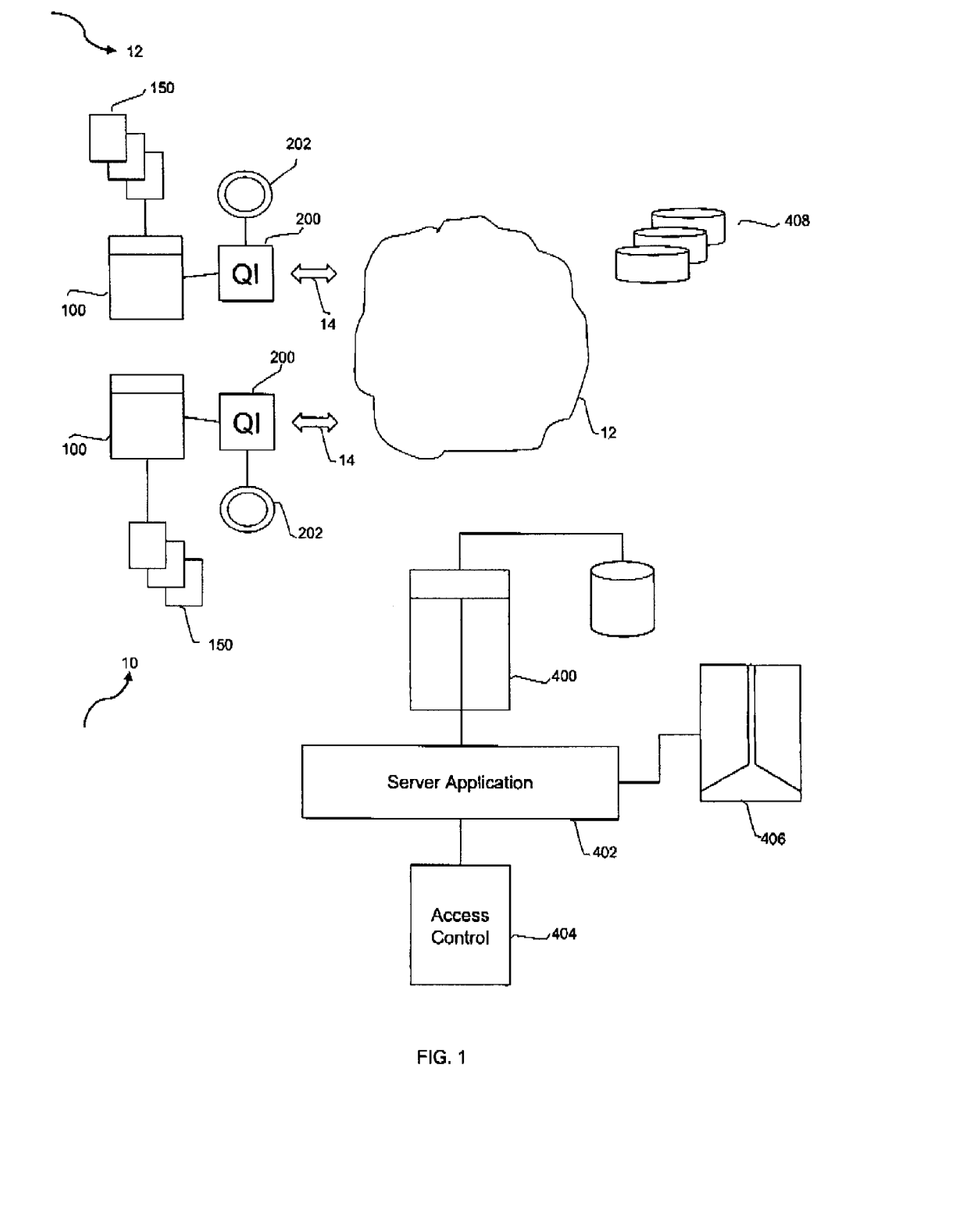
FIG. 1 shows a schematic block diagram of an implementation of the computer network implemented system of the present invention, for personal file protection or secure file sharing between two or more computing devices.

As best shown in FIG. 1, the computer network implemented system of the present invention has the following elements; (A) a central server (400) that manages access to the secure architecture; (B) at least one computer device (100); and (C) a security appliance (200) that is interoperable with the at least one computer device (100) to integrate the computer device into the secure architecture. The security appliance (also referred to in this disclosure as "QI" or "secure key devices") consists of a secure token that allows authorized users of the secure architecture to encrypt, decrypt, and securely share data (150) (files and/or folders) with other authorized users of the secure architecture, i.e. other QI users.

The central server (400) may be implemented as one or more server computers, based on any suitable computer network architecture. The computer network implemented system, incorporating at least one central server (400) and each authorized user with their QI device (200), as shown in FIG. 1, integrates these components into a seamless data security platform with unique and innovative features, as described in this disclosure. A skilled reader will understand that the computer device (100) need not be trusted. The QI device (200) however enables the computer device (100) to be used as part of the trusted security architecture of the present invention.

In this data security platform, the central server (400) includes a server application (402) that implements various platform resources as described below. A key aspect of the server application (402) is the access control utility (404) that is involved in each data security operation (encryption/decryption/secure file sharing for example) so as to provide a persistent and easy to use data security solution that has numerous advantages over the prior art detailed below.

In one aspect of the invention, the secure architecture incorporates two factor authentication, military grade encryption, data forensics technology, and a proprietary key management mechanism as detailed below.

In one implementation of the invention, the secure token of QI (200) may be implemented as a small, portable secure key device. In one implementation, QI (200) is an easy to use, plug and play device (no computer program to install) that works on any computer regardless of the computer device's (100) operating system. In one implementation for example, QI (200) is a USB drive device that a user can use in connection with any computer device, including for example with their laptop, a colleague's laptop, or a mobile device such as a smart phone. Also, a skilled reader will understand that QI (200) is not a USB storage device, and therefore it operates in "no USB drive" policy environments because no data can be stored on the QI (200) device. Also, it should be understood that QI (200) may also connect to the computer device (100) using a wireless data connection (e.g. Bluetooth or Near Field Communications).

A skilled reader will also understand the secure token of the present invention may also be implemented as software only, however, hardware implementation of the secure token is preferred because a software implementation may be more susceptible attacks such as malware or key logging.

The easy to use secure key devices (200) can be deployed across an organization with no technical support.

As will be explained in more detail, this secure key device (200) may be used to provide full data protection regardless of where the data is stored, and while the data is being shared between computer devices, whether between computer devices connected to a wired network, or connected via a wireless network.

As will now be described, the present solution addresses strong encryption (to protect sensitive files and folders), decryption (to recover the encrypted volumes), sharing (to allow other users to recover the encrypted volumes), and add-ons (to add, remove and modify QIs and contacts as further described below).

The solution of the present invention is easy to use, cost effective, and can be implemented without requiring extensive training or technical support. More generally, the present system, apparatus and method operates within a secure architecture using a portable, easily carried apparatus which functions as a physical secure key device (200). By utilizing a physical key the present system, apparatus and method makes strong data protection more accessible to organizations of all sizes such that their tiles are more secure and easier to use.

In order for a user to access data encrypted using QI (200), the user requires: their QI (200); a password for their QI (200); and the file or document. If the user has the QI and the password they can access the secure architecture of the present invention, however, they cannot access encrypted data (150). If someone has your QI, they don't have your password. If someone knows your password, they don't have your QI. Even if they have your QI and your password, they may not have the file as it is located somewhere else.

The secure key devices (200) are also configurable to work on virtually every operating system, whether on a desktop, laptop, touch pad, or mobile device, and they do not require any installation on a host machine.

Advantageously, the present system, apparatus and method utilizes two-factor authentication (i.e. the physical secure key device (200), and a correct PIN, password or pass-phrase) such that common methods of attack including social engineering attacks and key logging attacks are neutralized.

If the physical key is lost, it cannot be used without the correct password. If the password is compromised, it is useless without the physical key. In one implementation, if the wrong password is entered 10 times (for example) the QI will automatically disable itself.

In one aspect of the invention, a novel and innovative computer network implemented system ("computer system") is provided that includes a data security architecture that enables (A) the securing of files or folders including data (generally referred to as "files" in this disclosure) whether they are stored on a hard drive or in a cloud server (e.g. a cloud based document repository (408)) and also (B) secure sharing of files with one or more other computers linked to the computer network implemented system as long as they have a physical token of the present invention that is part of their QI (200) in this disclosure.

One contribution of the present invention is the overall secure architecture of the computer system that includes two or more secure end points (each end point being associated with a security appliance (200)) and at least one central security monitoring system (central server (400)). The secure end points consist of a suitable computer device (whether a desktop computer, laptop computer, tablet computer, or mobile device) and the secure key device (200) of the present invention.

In one implementation of the present invention, the secure architecture utilizes symmetric key cryptography. While there are advantages to the use of symmetric key cryptography, including robust computational operations, a skilled reader will understand that use of a symmetric key cryptography based architecture for secure sharing of files will result in the receiver then knowing the encryption key of the sender. In one aspect of the invention, the secure architecture of the present invention is configured to ensure that the receiver does not know the encryption key of the sender. In accordance with the present invention, rather than attribute a secret key per person as is done in prior art solutions, a secret key is assigned for each file by the computer system, which is then encrypted with the user encryption key (which is in a different location from the secret key), optionally into a "header".

The central server (400), in one aspect of the invention, is configured to decrypt and re-encrypt headers dynamically and to send the appropriate encrypted header to the recipient. The encrypted headers sent to the recipient in this way can be decrypted by the recipient, and only the recipient, thereby enabling the recipient to recover the file encryption key and decrypt the file without knowing any of the other user's encryption keys.

In other words, if person A shares a document with B and C, the central server (400) will dynamically re-create (at the time of secure file sharing) an encrypted header (the file encryption key encrypted) for B and for C such that only B can decrypt the B header and recover the file, and same is true for C. In essence, the secure architecture of the present invention removes the need for a prior art key management server in that keys are managed, as described, on the fly. A skilled reader will understand that this is a novel and innovative feature of the central server (400) which may be implemented as part of key management utility (406). This also makes re-keying easier (for example when a user encryption key has been compromised). By means of a simple update, a user may be given a new encryption key and since the header is decrypted and re-encrypted dynamically, users can share and receive documents without a problem. If for example PKI were used, it would be necessary to generate a new PAIR OF PUBLIC, PRIVATE KEYS and communicate the existence of the new PUBLIC key to contacts, and request that the contacts update their database.

A skilled reader will also understand that a number of suitable cryptographic operations may be used, including any operation with modular exponentiation. For example, in one aspect the invention, for authentication purposes a Diffie Hellman ("DH") key exchange method may be utilized. DH, however, is normally susceptible to man in the middle attacks.

Therefore, in another aspect of the invention, a requirement for prior knowledge is included at the two or more secure end points. This prior knowledge, in one implementation, consists of each user associated with the two or more secure end points providing a password or other suitable means of authentication to the security appliance. In another aspect of the invention, the secure token includes a pre-installed value and this is combined with the password to generate a one time unique information set to generate a one time stamp in the authentication mechanism. Moreover, the security architecture is configured so that the pre-installed value and the password cannot be derived from the unique information set.

Figure 2:
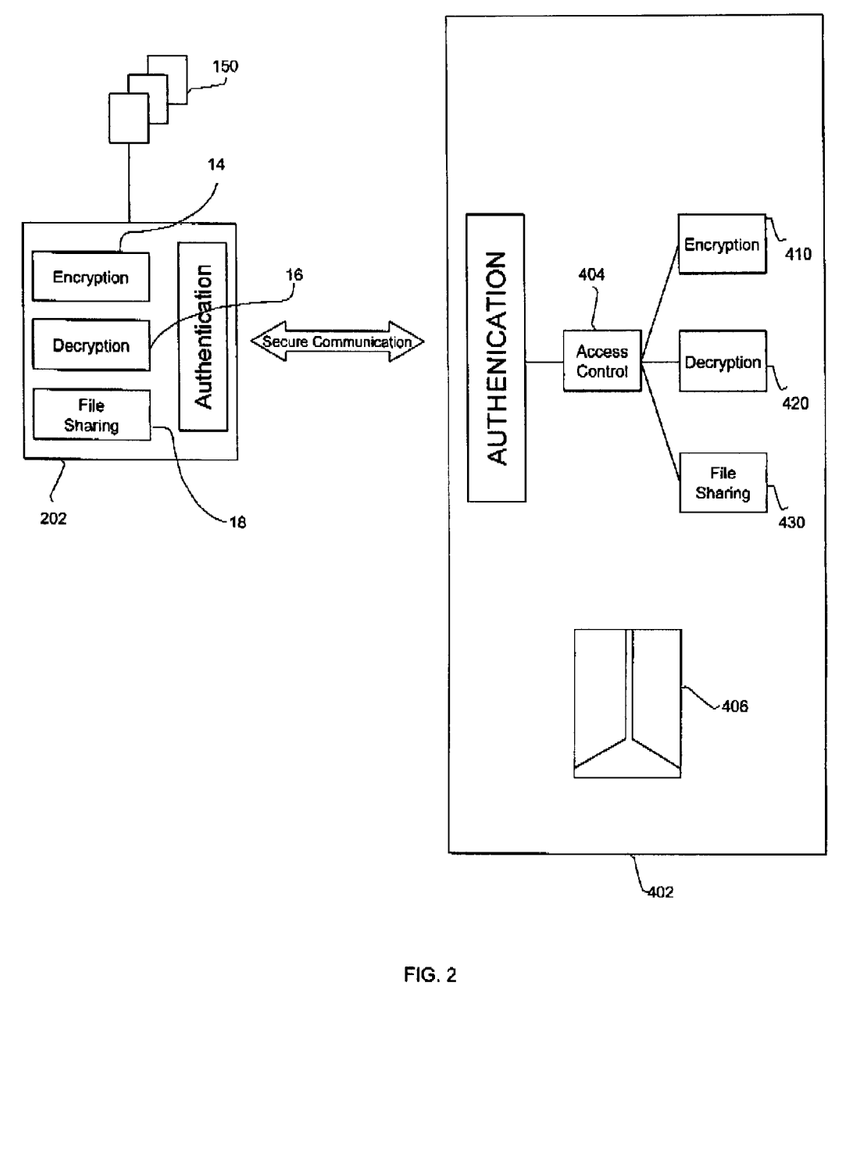
FIG. 2 shows a schematic block diagram illustrating an implementation of the server application of the present invention.

In another aspect of the invention, as best illustrated in FIG. 2, the central server, through server application (402) manages end to end data security by acting as an intermediary between a first secure end point and at least one other remote secure end point for confirming that the password or other suitable means of authentication has been provided prior to the central server (400)) authenticating the user (by confirming that the combination of the right QI and associated suitable means of authentication such as password has been used). The remote secure end point is authenticated based on authentication of the user.

In one aspect, once the user is authenticate, s/he is able to access certain privileges based on company policies, and thereby can engage in data security operations through the secure architecture of the present invention, e.g. encrypt, decrypt and share documents. A skilled reader will appreciate, however, that in one aspect of the invention, even once a user is authenticated (as described) any action or data security operation requires authentication through the access control utility (404), and as described in greater detail below.

As shown in FIG. 2, at each secure end point, QI includes a computer program component (202) that enables the authentication of the user to the server application (402), by means of the server application's (402) authentication resources. Computer program component (202) may be implemented as an onboard application that provides authentication of the user and also includes one or more user interfaces (not shown) for accessing encryption/decryption/secure file sharing functions. More specifically, onboard application (202) includes an authentication utility, an encryption utility (14), a decryption utility (16) and a file sharing utility (202), thereby enabling a user to encrypt data (150), decrypt data (150) (whether stored to the memory of a computer device or received from another secure end point via the central server), and sharing files on a secure basis via the central server.

Onboard application (202) may be implemented as a bounded computer program. This is to ensure that the bounded computer program cannot be compromised by another computer program component on the computer device. In one implementation, the bounded computer program similar to a Java Virtual Machine. As a result, the information held by the bounded computer program is stored within memory of the computer device but within boundaries defined by the onboard application (202) so as to limit accessibility to operations of the onboard application (202). In order to implement the onboard application (202) in this way, the onboard application (202) is configured to function as a virtual sandbox.

As explained earlier, in one aspect of the invention, the server application (402) is involved as an intermediary in the data security operations enabled by the present invention. Therefore, the server application (402) may be implemented so as to include central server side utilities, namely an authentication utility, encryption utility (410), decryption utility (420), and secure file sharing utility (430), that interoperate in the manner described in this disclosure with the corresponding authentication utility, encryption utility (14), decryption utility (16) and the file sharing utility (18) on the secure end point side of the security architecture. The access control utility (404) manages these various operations, relying on the resources of the key management utility (406).

In one aspect of the invention, the secure architecture ensures two-way authentication, while leveraging the desirable computational characteristics of DH or other similar authentication mechanisms.

Another contribution of the invention is the use of a secure token not only for authentication, but also for securing files, tracking files, and enabling secure sharing of files. This aspect of the invention, and the implementation of this aspect as part of the computer system, is a key insight for enabling the integration of the components described to provide the overall, secure, and easy to use data security architecture of the present invention. The secure token may be described as an intelligent token.

A skilled reader will appreciate that, in the computer system of the present the central server acts as a necessary intermediary in each encryption/decryption or secure file sharing. Because the central server is invoked in each case, the central server is configurable to enforce access control policies as further described below, by operation of the access control utility (404). For example, if a particular user has been blocked by the operator of the platform (because their access credentials have been terminated, or access to files in a particular location is not permitted), the central server will not authenticate the participating secure end points, and thereby encryption/decryption or file sharing will not be possible.

It should be understood that the computer system implements a series of types of system messages, having a defined message structure, that enables messaging as between QI (200) and the central server (400) to enable the data security operations described in this disclosure. System messages include: (A) authentication messages, (B) firmware update messages (for updating firmware to update onboard application and therefore QI (200) functionality, (C) update of contacts accessible through QI (200) for managing contacts for initiating secure file sharing using QI (200), (D) change passwords, (E) encrypt files, (F) decrypt files, and (G) share files. A skilled reader will appreciate that such system messages may be constructed in a number of different ways.

Key Management Operations

A skilled reader will understand that the key management utility (406) may be implemented in a number of different ways. In one implementation of the invention, the key management utility (406) implements key management operations that include both (A) and (B) type approaches as described below:

(A) A key separation may be used=10001=10 put next to piece 001=>10 001

(B) And key splittings may be used=10001=11000 XOR 01000

(C) An XOR operation may be used—an exclusive OR function between 11000 and 01000 you will get 10001

As a result of key separation, if you find the first piece for instance, you only have the find the 3 reminder number.

In key splitting, if you find one piece (5 numbers) you still have the find the whole 5 numbers of the other piece.

In another aspect, every time a password is wrong, a timer may be increased, such that for example if it is a first time a user types a wrong password, the user has to wait 1 second to type the second one. The second time the password is wrong the user has to wait 2 seconds, then 4 s etc. After a predetermined number of incorrect passwords is entered, the secure key device 200 can automatically be disabled.

As well, in an aspect, a mechanism preventing brute force attacks is built in.

Significantly, the present system, apparatus and method provides an easy way to secure files through two factor authentication, while requiring no access to the file contents at any point in time. That is to say, it is not necessary to be able to open a file in order to protect the file.

Furthermore, the present system, apparatus and method provides data security independent of the location of the file or folder—whether the file is a laptop, desktop, remote server, or mobile device. As well, there is no limit on the number of files that can be encrypted, nor is there a limit on the size of the files that can be encrypted. Furthermore, the present system, apparatus and method also works for folders, and folder that hold subfolders, and everything stored within the folder(s) may also proceed. For example, it works for folders that contain sub folders and files, and encrypting a folder like "My Documents" in MS Windows, will protect everything inside that folder.

One significant advantage for organizations is that the present system, apparatus and method is transparent and can be deployed on virtually any computer system, hence reducing, and potentially avoiding any significant integration problems. Rather, the present solution provides data security that fits into the way the organization works.

Another significant advantage is that there is no infrastructure for the client to maintain. One or more administrative accounts may be created for each organization using the computer system of the present invention such that someone (even non technical staff) can manage the secure key devices for an organization if necessary, without affecting the underlying security mechanisms.

Figure 3:
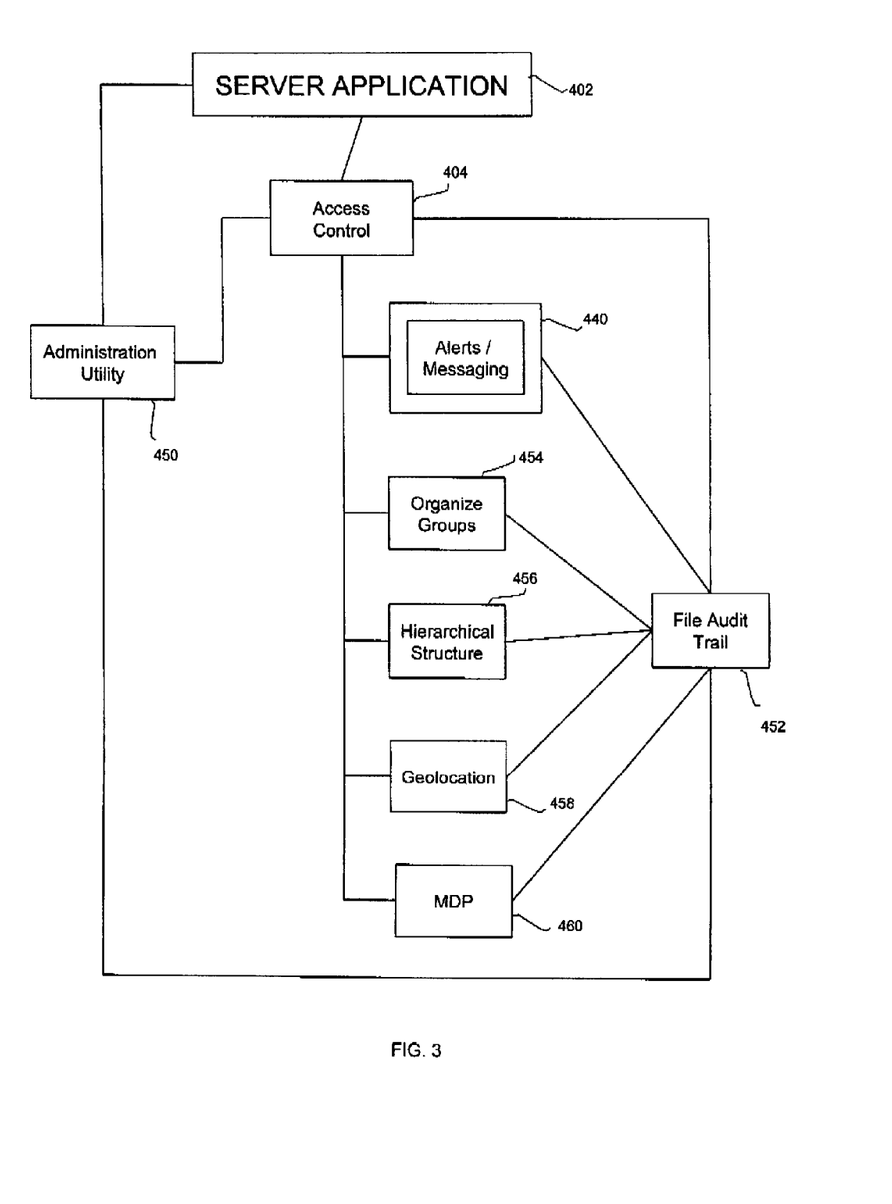
FIG. 3 is a further schematic block diagram showing possible resources of the server application of the present invention.

As illustrated in FIG. 3, the server application (402) implements a web platform that may be accessed by authorized administrators by providing credentials to the administration utility (450). The web platform may be implemented as an administrative dashboard for example, in order to manage various aspects of implementation of the secure architecture of the present invention in an enterprise environment. The web platform enables administrators to easily manage for example thousands of QIs in an enterprise by accessing a range of different business services available through the server application (402), including for example (A) remote deactivation, (B) file audit trail, (C) geo-location, (D) massive decryption prevention, and (D) real-time alert notifications. It should be understood that the server application (402) may be extended to include various other features or operations that may be useful in managing data security operations and QIs in an enterprise environment. These various platform features and operations may be understood as "add-ons" to the computer system of the present invention.

In one particular implementation of the invention, the access control utility (404) may be configured to include one or more utilities that enable the analysis of use of the computer system of the present invention by various users or groups of users. This usage information may be compared for example to a series of data security best practice records or templates accessible to or made part of the access control utility (404). The access control utility (404) may be operable to compare the usage information to such best practices to identify activities, users, or groups of users that are placing the enterprise's data security at risk. The server application (402) may enable administrators to select applicable best practice templates, for example based on the nature of the enterprise's business or the sensitivity of data or selected files or file types. The access control utility (404) upon identifying data security operations, through the file audit trail, that may pose a risk may send an alert/message to an administrator for example, or the computer system may be configured so that automated restrictions are placed on relevant activities or users. A skilled reader will understand that various other useful features may be provided including automated features.

As shown in FIG. 3, the access control utility (404) is linked to a series of utilities that enable administrative users to manage various aspects of data security operations, as described below. These utilities in turn link to the file audit trail utility, which monitors various activities including activities through the utilities listed below.

The administration utility (450) enables administrative users to manage a variety of functions related to the management of users and their QI devices, and through them their access to the security architecture of the present invention. The functions of the administration utility (450) may be similar to the functions and operations available through a key management portal. For example, administrative users may add or remove QI devices from the users' organization's infrastructure. Additionally, particular secure key devices can be temporarily or permanently deactivated and remotely wiped if lost.

A utility may be provided to organize groups (454). For example, an organization can create different groups or users, reflecting the corporate structure of the organization. In an aspect, each secure key device can then be attributed to one or more group(s) such that the sharing of documents (for example) can take place on a secure basis through the computer system between members of a group in a more effective and efficient way. As an illustrative example, consider a group representing the accounting department of an organization. A document can be shared with that group automatically, giving access to the document to all of the secure key devices 200 registered to users in that group.

Another utility may be provided to enable geolocation based business services (458) and in one example of the implementation of the present invention associated alerts/messages through the alerts/messages utility (462). The geolocation utility (458) permits an administrator to define geographic areas that are considered risky by an enterprise in order to define a subset of data security operations for particular geographic areas. For example, an enterprise may have particular concerns about corporate espionage in particular geographic areas. The geolocation utility (458) may present for example a map interface that enables the management of geolocation based rules. In a particular aspect the geolocation utility (458) enables the administrator to define various "policies" for use of the secure key devices based on geography. For example, the administrator may restrict use of secure key devices outside of a single authorized country, and if an attempt is made to use a secure key device from outside the country, the administrator may receive, by operation of the alerts/messages utility (462) a notification, for example a text message or email on his/her mobile device alerting the administrator that key number 123XYZ has just attempted a connection and has been blocked.

In a further aspect, the geographic location limitation may be much more specific, for example limited to a certain building location—a secure key device which works at the office may be disabled when an attempt is made to use it on a laptop at a coffee shop for example.

In a further aspect, a secure key device 200 may be made device specific, such that the secure key device only works with a particular desktop, laptop, tablet or mobile device to which it is assigned. This manner of limiting the secure key device 200 may provide a further layer of security for data that is highly sensitive and is meant to be accessed from one or a few specific computer(s) only.

The hierarchical structure component or utility (456) enables administrators to apply various policies, including some of the policies discussed above, on a hierarchical basis by defining a variety of user hierarchies, using one or more web screens presented by the server application (402). For example certain of the policies may be assigned only to certain user hierarchies defined by the administrator. In another implementation, using the hierarchical structure utility (456) may be used to configure \the secure key devices in such a way that one or more "master" secure key devices may be created for use by a manager, supervisor or administrator. For example, the head of a department, division, or group may be granted access to any file that has been encrypted using a key registered to that specific department, division or group. As another example, the CEO or any other senior executives such as the COO, CFO, etc. may be granted access to any encrypted file of their department, division, group or company.

As mentioned earlier the secure architecture of the present invention enables unique stamps to associate with each data security operation involving enterprise data. This enables a number of different useful functions including those provided by the file audit trail component or utility (452). In one implementation, for each encrypted file, the owner can see exactly who is authorized to access the file, and also see who accessed the file including when and where the file was accessed. If a file is leaked intentionally or otherwise, then the owner can look at exactly who had access to the file when the leak took place.

In another aspect of the invention, the server application (402) includes a massive decryption prevention utility or "MDP" component or utility: (460). For example, if a user decrypts X number of files in Y amount of time, the user may be blocked by the MDP utility (460) from further decryption if the number of files decrypted seems out of the ordinary. For example, this blocking may be used for a trusted employee who is suddenly decrypting a lot of information in preparation for departing to the competition.

In another particular aspect of implementation of the present invention, the access control utility (404) may include or link to a mechanism for generating and viewing various statistics or analytics regarding usage of the security architecture, including at the security key device level. Several metrics may be monitored, and therefore the customer can immediately identify relevant metrics or information. For example, one metric may show real time activity for the distributed secure key devices by jurisdiction, or worldwide, as represented on an electronic map, similar to a Google™ map. Furthermore, the access control utility (404) may include or link to a reporting utility that generates and provides to administrators various reports for consuming information relevant to managing data security risk for the enterprise.

In one aspect of the invention, the secure key device (200), when plugged into a computing device 100, transforms that computing device into a secure end point of a secure architecture. While the secure key device (200) is inserted into the computing device (100), a user is able to encrypt, decrypt and securely share all of their data with fellow users within the secure architecture, as well as to keep track of who is accessing which shared files or folders.

In another aspect, the secure key device (200) may operate as a virtual sand box, and make use of a U.S. Department of Defence (DoD) standard approved approach to remove traces of the secure key device (200) when the secure key device (200) is removed from the computing device (100), hence preventing potential forensic recoveries of traces of plaintext files, passwords, or encryption keys.

In another aspect of the invention, for additional security, every file to be protected is encrypted with a different encryption key. Although it is computationally virtually impossible for an attacker to decrypt a file without the correct encryption key, if an attacker was somehow successful at recovering the encryption key, at most one file would be compromised, and significant computational resources would then need to be expended attacking each other file, making such an attack quite impractical.

Additionally, because there is nothing confidential stored on the secure key device (200), exposing its content and reverse engineering the portion of the technology residing on the secure key device (200) does not compromise the security of the secure architecture.

Furthermore, in a preferred aspect, the secure key device (200) cannot be used to add to or remove files from the secure key device (200) itself. Thus, as mentioned earlier, the secure key device (200) can be used even in organizations that have a no USB drive policy to prevent data leakage.

In one aspect of the invention, the secure key device (200) allows a user to encrypt and decrypt selected data files (150) to safely protect their contents from unauthorized persons. In an aspect, to be able to use the secure key device (200), the user will first need to enter the correct password or passphrase 210. This password/pass-phrase entry may be done through a graphic interface on the computing device (100), and an Internet connection may used to connect the computing device (100) to a back-end server (not shown) of the secure architecture.

Advantageously, in one aspect of the invention, the secure key device (200) is inserted into the computing device (100) so as to provide two factor authentication, significantly increasing the level of security. Additionally, the use of a secure key device (200) as one of the authenticating factors reduces the complexity of encrypting or decrypting files or folders. Normal operations to encrypt or decrypt a file should therefore take no more than three clicks, in one implementation of the invention. Additionally, the user interface presented by the onboard application (202) may provide drag and drop functionality to allow files or folders to be easily encrypted or decrypted, simply by dragging and dropping them into an appropriate area of the user interface displayed on the screen.

In another aspect of the invention, a user is able to share his/her encrypted files (150) with other users who are given permission to access the encrypted files (150), and who also have an authorized secure key device (200) to unlock the files (150). The files (150) are encrypted on the computing device (100) using an encryption algorithm provided by the secure key device (200). Thus, only the customer and data owner can access the file contents.

Other users may decrypt the files (150) by using authorized secure key device (200) (in one implementation inserted into their computing device (100)). In normal operation and in one implementation, the decryption also takes no more than three clicks to complete.

If a user's computing device (100) is lost or stolen, or if there is a breach on the network infrastructure, the present system virtually assures that the encrypted files (150) cannot be recovered by an attacker, and the information protected is therefore safeguarded. As an illustrative example, the algorithm used for encryption may be an Advanced Encryption Standard (AES 256) algorithm, which is a U.S. Department of Defence standard for encryption.

In the event an attacker is somehow able to gain access to both the encrypted files (150) and the secure key device (200), the protected files (150) will still be secured, as a password is needed to enable the secure key device (200). If too many incorrect passwords are entered, the secure key device (200) may be configured to automatically disable itself, and is no longer available for use. At this point no file encrypted using this secure key device (200) can be recovered. More specifically, the file can only be recovered by another key that has been given access, or by someone with a key that has a higher priority, such as a master key.

However, because some users might forget the password for their secure key device (200), it is possible for an administrator or data security service provider to re-enable the secure key device (200) over the phone for example, after proper credentials have been verified, as part of a customer service offering.

In another aspect of the invention, if a secure key device (200) is lost, stolen or destroyed, the administrator or data security service provider can remotely deactivate the secure key device (200) and provide a duplicate replacement, while making sure that the first key, the one lost, can never be used again.

In another aspect, the administrator or data security service provider can also offer an emergency file recovery mechanism, for example using a web interface, to provide a duplicate secure key device (200). The duplicate secure key device 200 can be delivered, for example, within 24-48 hours of the request by using a rush courier service.

In another aspect, the present system, apparatus and method offers a sharing function that allows secure key device (200) users to securely share encrypted files over a company's private networks, or otherwise unsecured channels such as the Internet.

In another aspect, the present system, apparatus and method also allows a user to give the right to recover encrypted files to one or more other users. The encryption and decryption steps are performed on both ends (sending and receiving) hence making it possible for the file to be transmitted in its encrypted form.

The secure key device (200) has been designed taking into account convenience for users, as it is easy to use and does not require any training. In addition, the secure key device (200) is resistant to known IT vulnerabilities and attacks such as brute force attacks and forensics recoveries, to name just a few.

In one aspect of the invention, file encryption takes place on the client computing device (100), and not at the back-end central server (400), although the central server (400) may act as an intermediary as described before. This allows files and folders of any size to be encrypted on the client computing device (100) using information located on the secure key device (200).

However, during encryption or decryption, client computing device (100) communicates with an encryption utility or module (410) of the back-end server (400). The encryption module (410) performs various functions, including sending pieces of authorizing or authenticating data or information to the client computing device (100) such that the encryption or decryption can be allowed to proceed on the client computing device (100). Thus, the actual encryption or decryption does not take place at the back-end central server (400). As well, the password for the secure key device (200) is never stored or transmitted; it is only used to derive one time use information as described above. Also, the back-end server (400) does not have access to any files encrypted by the secure key device (200).

In illustrative example of the computer system in operation, a message is initiated by a secure key device (200) through its associated client computer device (100) to the central server (400) with the header for example of "Encrypt file". This triggers associated actions on the central server (400), namely in one implementation authentication of the client computer devices (100) and reply to the secure key device (200) using a one time use message such as "OK" or "PROCEED", thus enabling the secure key device (200) to encrypt the file on the client computing device 100.

Computer Implemented Method

Figure 4:
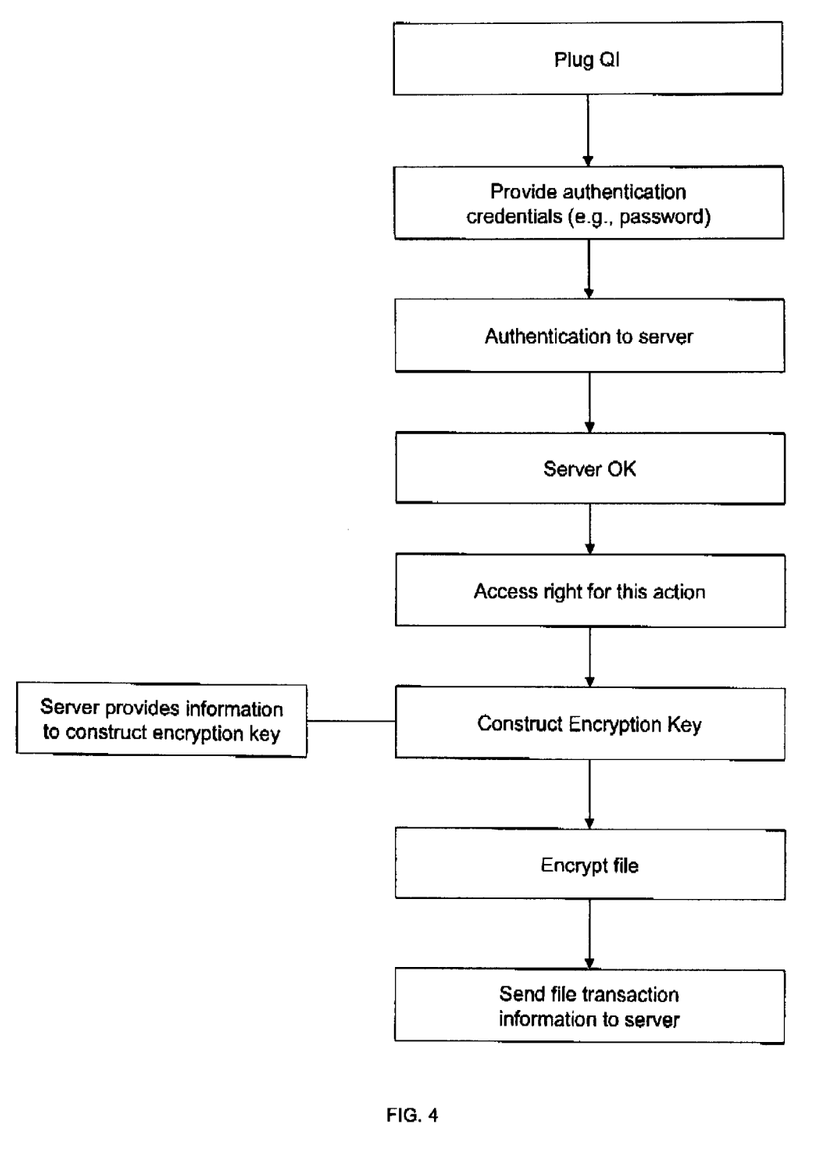
FIG. 4 is a workflow diagram illustrating a file encryption method in one implementation of the invention.

As shown in FIG. 4, the computer implemented method of the present invention may be explained as including the following steps:

(A) A secure key device (200) is inserted into the computing device (100).

(B) A user interface is presented (by operation of the onboard application) as a result of the insertion of the secure key device (200) requesting that the user provide authentication credentials, e.g. a password or pass-phrase.

(C) The password or pass-phrase together with some data on the device are used to generate values that are then used in an authentication protocol on the central server. The authentication may then be sent to the central server (400) for verification as part of the authentication process. The central server (400) may be connected via the Internet, for example, via a wired or wireless connection.

(D) Once the authentication process with central server (400) is completed with success, a verification message (e.g. "OK") is returned to the client computing device (100).

(E) Upon authentication of the password to enable the secure key device (200), a request to encrypt a file is sent from the client computing device 100 to the server 400.

(F) The file to be encrypted can then be encrypted on the client computing device (100) using a strong encryption algorithm available from the secure key device (200). In one aspect the encryption key is constructed in part based on information provided by the central server (400).

(G) Once the file is encrypted, the client computing device (100) provides a confirmation that the file has been encrypted.

The file is now in an encrypted form, and remains stored at the client computing device 100 for storage, or for communication or transmission as may be desired.

It should be understood that steps of requesting authentication, and obtaining information from the central server (400) in order to construct the encryption key may be provided as one set of interactions between the secure key device (200) and the central server (400).

Figure 5:
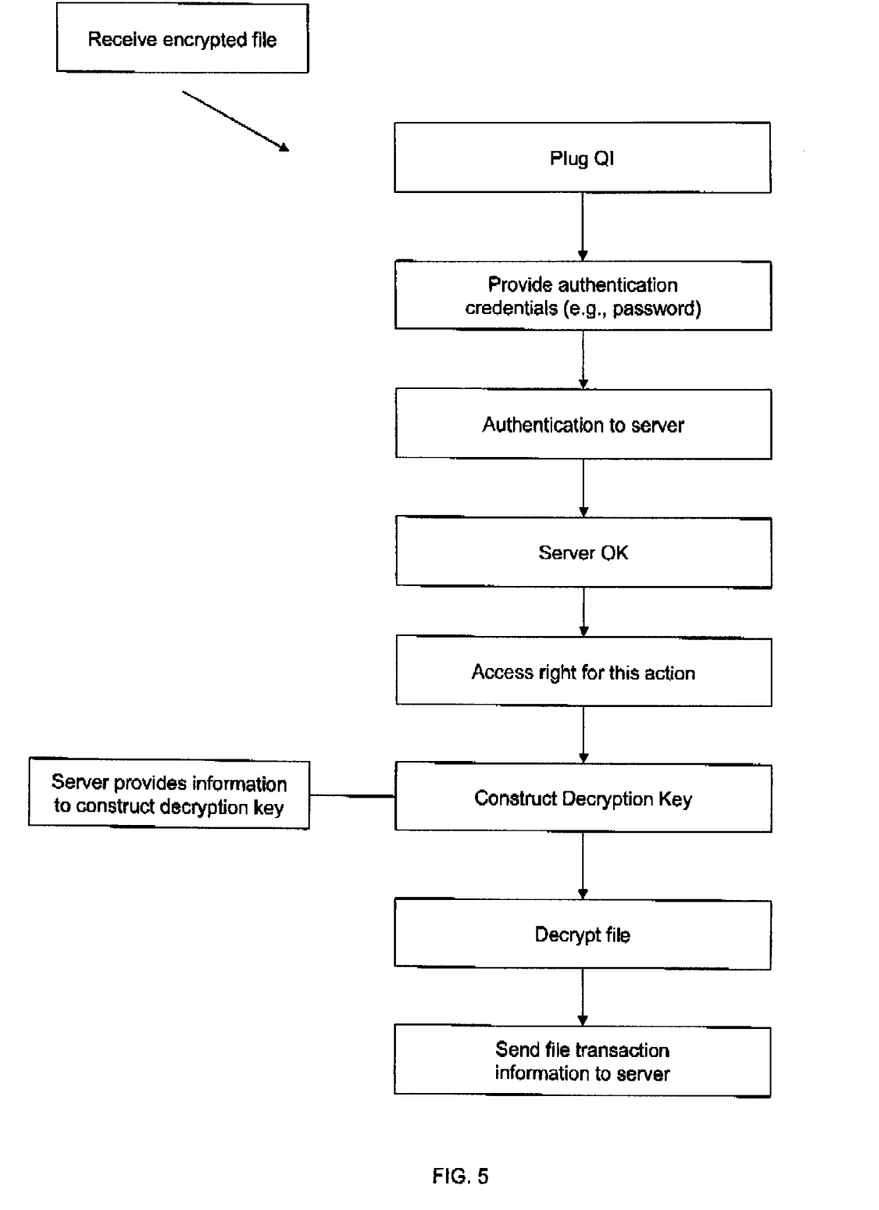
FIG. 5 is a workflow diagram illustrating file decryption method in one implementation of the invention.

FIG. 5 illustrates another aspect of the computer implemented method of the present invention, namely the decrypting of a file using the secure architecture of the present invention. The secure file sharing method of the present invention involves the decryption of a file (as shown in FIG. 4 for example, sharing the file with another computer device (100) with a secure key device (200) and decryption of the file at the other computer device (100) as shown in FIG. 5 for example.

In summary, the system and method collects information regarding who wants to encrypt, and what files to encrypt, etc. without actually collecting the contents of the files. This way, the system and method delivers services without having access to customer's file content. In that sense, the server 400 serves as a data monitoring tool. In addition, the server 400 executes some actions that allows for services to be render on the customer's side.

Without the server 400, the client 100 does not work. This is how the system and method can achieve great security, without having the overall security of the architecture compromised if the client is compromised.

It should be noted that each secure key device (200) is unique. Thus, for example, while a group of users (e.g. in an accounting department) may each have a secure key device (100) authorized to access certain data shared by the group, the secure key devices are not identically keyed. That is, one user may have a secure key device 100 that is authorized for access to the accounting group, as well as data shared with the finance group.

Figure 6:
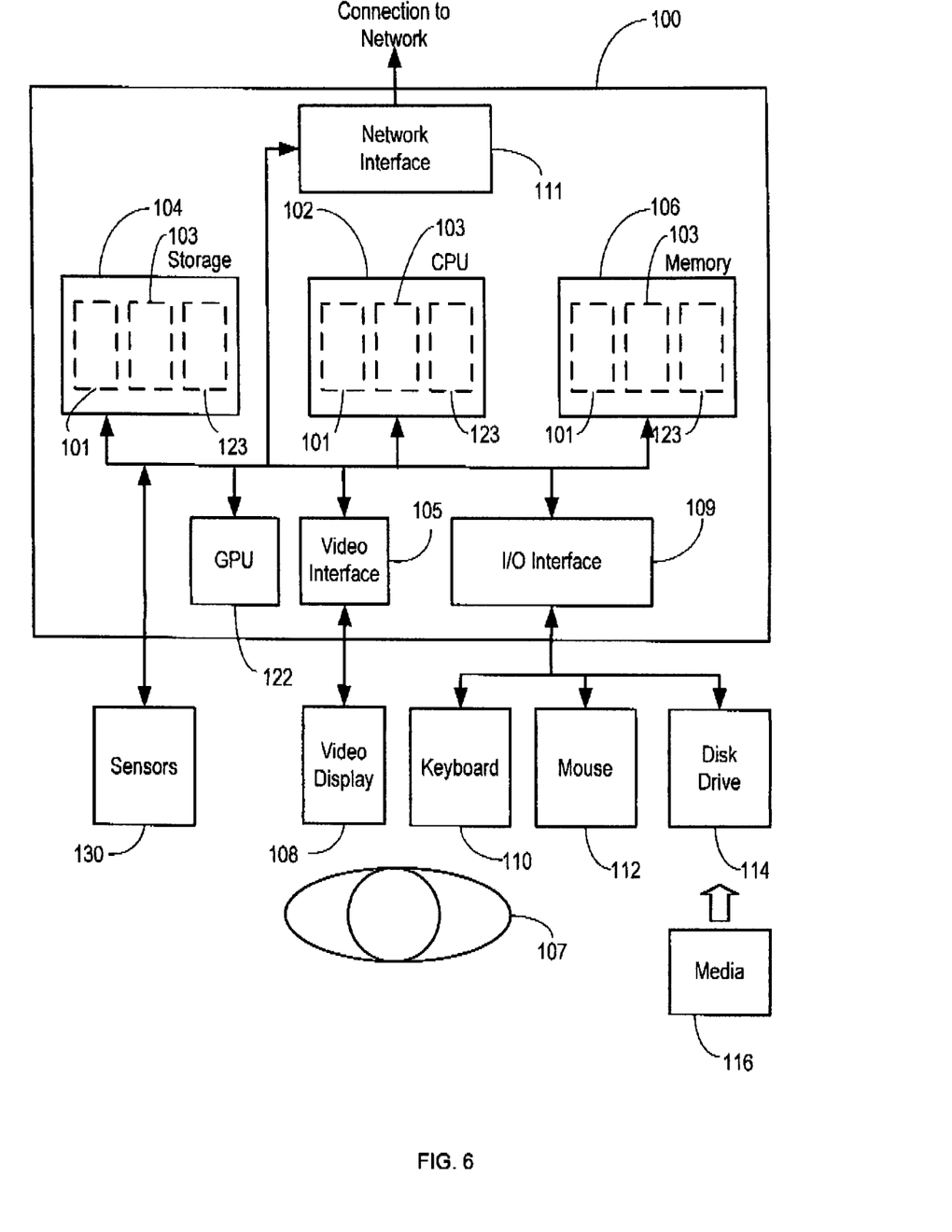
FIG. 6 shows a schematic block diagram of a generic computing device which may provide a suitable operating environment for various aspects.

The present invention may be practiced in various aspects. A suitably configured computer device, and associated communications networks, devices, software and firmware may provide a platform for enabling one or more aspects as described above. By way of example, FIG. 6 shows a generic computer device (100) that may include a central processing unit ("CPU") (102) connected to a storage unit (104) and to a random access memory 106. The CPU (102) may process an operating system (101), application program (103), and data (123). The operating system (101), application program (103), and data (123) may be stored in storage unit (104) and loaded into memory (106), as may be required. Computer device (100) may further include a graphics processing unit (GPU) (122) which is operatively connected to CPU (102) and to memory (106) to offload intensive image processing calculations from CPU (102) and run these calculations in parallel with CPU (102). An operator (107) may interact with the computer device (100) using a video display (108) connected by a video interface (105), and various input/output devices such as a keyboard (110), mouse (112), and disk drive or solid state drive (114) connected by an I/O interface (109). In known manner, the mouse (112) may be configured to control movement of a cursor in the video display (108), and to operate various graphical user interface (GUI) controls appearing in the video display (108) with a mouse button. The disk drive or solid state drive (114) may be configured to accept computer readable media (116). The computer device (100) may form part of a network via a network interface (111), allowing the computer device (100) to communicate with other suitably configured data processing systems (not shown). One or more different types of sensors may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable a computer device to implement each of the various process steps in a method in accordance with the present invention. It is understood that the terms computer-readable medium or computer useable medium comprises one or more of any type of physical aspect of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

While a USB drive device has been described as an illustrative example of a secure key device, it will be apparent that other similar devices which may store data and may be connected to a computing device via an I/O interface may also be used. However, preferably, the secure key device should be sufficiently small and portable such that it is easily carried. In an alternative aspect, the secure key device need not connect physically to a computing device via an I/O interface, and may instead be connected wirelessly to the computing device via a wireless interface. Data security operations are either performed on the computer device, but within the bounded computer program, or on the security key device itself by implementing the secure key device as an advanced secure processor, or a combination of the two.

It should be understood that further enhancements to the disclosed system, method and computer program are envisioned.

Further Advantages

In addition to the various other advantages of the present invention:

The present invention is cost effective, easy to manage.

Its deployment and management requires little or no training of staff or technical support and therefore makes a robust data security system available to many enterprises for whom prior art solutions were not a viable option.

The system is very easy to use and thereby promotes user adoption and adherence.

The architecture provides robust security and also enables central management around enterprise data security policies which can be changed over time to manage data security risk effectively.

The computer provides access to various business services, through a convenient web portal, thus providing a comprehensive enterprise solution.

The security key device requires no battery and therefore promotes sustainability.

The security key device and secure architecture overall interoperates with a wide variety of computer devices including mobile devices which are not normally addressed by prior art solutions.

The invention claimed is:

1. A method of securely sharing a data file, the method comprising:
(a) receiving, by a computer device, a portable secure key device that is interoperable with the computer device, the portable secure key device having a processor, the portable secure key device including a pre-installed value, the portable secure key device being unique;
(b) receiving, by the computer device as user input, login information;
(c) generating, in response to the pre-installed value and the login information, a one time unique information set to generate a one time stamp for authenticating to a central server;
(d) sending authentication information to the central server for verification;
(e) if an authentication process performed by the central server is successfully completed, sending a verification message from the central server to the computer device;
(f) assigning to the data file a secret key associated with symmetric cryptography;
(g) encrypting the data file by the computer device using an encryption algorithm provided by the portable secure key device and an encryption key constructed in part based on information provided by the central server;
(h) encrypting the secret key using a user encryption key so as to generate a header;
(i) decrypting the header by the central server;
(j) re-encrypting, by the central server, the header as a file encryption key encrypted for the recipient;
(k) sending the re-encrypted header to a recipient, thereby enabling the recipient only to recover the file encryption key without the recipient knowing the user encryption key;
(l) recovering, by the recipient, the file encryption key; and
(m) decrypting the data file by the recipient.

2. The method of claim 1 wherein receiving, by a computer device, a portable secure key device that is interoperable with the computer device, the portable secure key device having a processor, the portable secure key device including a pre-installed value, the portable secure key device being unique, comprises receiving the portable secure key device at an I/O interface of the computer device, the portable secure key device being a USB drive device configured not to be a USB storage device.

3. The method of claim 1 wherein generating, in response to the pre-installed value and the login information, a one time unique information set to generate a one time stamp for authenticating to a central server comprises generating the one time unique information set so that the pre-installed value and the login information cannot be derived from the one time unique information set.

4. The method of claim 1 wherein if an authentication process performed by the central server is successfully completed, sending a verification message from the central server to the computer device comprises disabling the portable security key device after a predetermined number of incorrect passwords has been entered.

5. The method of claim 1 further comprising restricting use of the portable secure key device outside of a specifiable geographic limitation.

6. The method of claim 1 further comprising restricting use of the portable secure key device to a particular computer device to which it is assigned.

7. A computer network implemented system for securely sharing a data file, the system comprising: a central server, a computer device and a portable secure key device that is interoperable with the computer device, the portable secure key device having a processor, the portable secure key device including a pre-installed value, the portable secure key device being unique, wherein the system is operable to securely share a data file by:
- (a) receiving the portable secure key device by the computer device;
- (b) receiving, by the computer device as user input, login information;
- (c) generating, in response to the pre-installed value and the login information, a one time unique information set to generate a one time stamp for authenticating to the central server;
- (d) sending authentication information to the central server for verification;
- (e) if an authentication process performed by the central server is successfully completed, sending a verification message from the central server to the computer device;
- (f) assigning to the data file a secret key associated with symmetric cryptography;
- (g) encrypting the data file by the computer device using an encryption algorithm provided by the portable secure key device and an encryption key constructed in part based on information provided by the central server;
- (h) encrypting the secret key using a user encryption key so as to generate a header;
- (i) decrypting the header by the central server;
- (j) re-encrypting, by the central server, the header as a file encryption key encrypted for the recipient;
- (k) sending the re-encrypted header to a recipient, thereby enabling the recipient only to recover the file encryption key without the recipient knowing the user encryption key;
- (l) recovering, by the recipient, the file encryption key; and
- (m) decrypting the data file by the recipient.

8. The computer network implemented system of claim 7 wherein the computer device is operable to receive the portable secure key device at an I/O interface of the computer device and wherein the portable secure key device is a USB drive device configured not to be a USB storage device.

9. The computer network implemented system of claim 7 wherein the system is configured so that the pre-installed value and the login information cannot be derived from the one time unique information set.

10. The computer network implemented system of claim 7 wherein the system is operable to disable the portable secure key device after a predetermined number of incorrect passwords has been entered.

11. The computer network implemented system of claim 7 wherein the system is operable to restrict use of the portable secure key device outside of a specifiable geographic limitation.

12. The computer network implemented system of claim 7 wherein the system is operable to restrict use of the portable secure key device to a particular computer device to which it is assigned.

13. The computer network implemented system of claim 7 wherein the portable secure key device includes a computer program component implemented as a bounded computer program configured to make an untrusted computer device part of a trusted security architecture enabled by the secure data architecture.

14. The computer network implemented system of claim 7 wherein the central server includes or is linked to a server application that includes an access control utility that is invoked in each of a plurality of data security operations enabled by the data security architecture so as to provide persistent avoidance of man-in-the-middle type security attacks and provide access to audit trail information for enterprise managed data security operations.

15. The computer network implemented system of claim 14 wherein the server application enables one or more authorized administrative users through a web portal to manage a plurality of the portable secure key devices, and their use by authorized users based on a series of enterprise security policies.

16. The computer network implemented system of claim 14 wherein the server application enables one or more authorized administrative users to define or select one or more enterprise security policies, the server application being operable to automatically implement said enterprise security policies in connection with a plurality of the portable secure key devices such that the system is operable to temporarily or permanently deactivate and optionally remotely wipe one or more of the plurality of portable security key devices.

* * * * *